United States Patent
Ruggeri

(10) Patent No.: US 11,095,370 B2
(45) Date of Patent: Aug. 17, 2021

(54) SYMMETRICAL SUPERVISORY OPTICAL CIRCUIT FOR A BIDIRECTIONAL OPTICAL REPEATER

(71) Applicant: Alcatel Submarine Networks, Nozay (FR)

(72) Inventor: Stephane Ruggeri, Magny-les-Hameaux (FR)

(73) Assignee: ALCATEL SUBMARINE NETWORKS, Nozay (FR)

( * ) Notice: Subject to any disclaimer, the term of this patent is extended or adjusted under 35 U.S.C. 154(b) by 0 days.

(21) Appl. No.: 16/793,294

(22) Filed: Feb. 18, 2020

(65) Prior Publication Data
US 2020/0266897 A1 Aug. 20, 2020

(30) Foreign Application Priority Data
Feb. 15, 2019 (EP) ..................................... 19305187

(51) Int. Cl.
*H04B 10/297* (2013.01)
*H04B 10/25* (2013.01)
*H04J 14/02* (2006.01)

(52) U.S. Cl.
CPC ........... *H04B 10/297* (2013.01); *H04B 10/25* (2013.01); *H04J 14/02* (2013.01)

(58) Field of Classification Search
None
See application file for complete search history.

(56) References Cited

U.S. PATENT DOCUMENTS

| 5,436,746 A | 7/1995 | Hirst |
| 5,469,428 A | 11/1995 | Tokura et al. |
| 6,008,934 A | 12/1999 | Fatehi |

(Continued)

FOREIGN PATENT DOCUMENTS

| EP | 0981215 A2 | 2/2000 |
| EP | 1035669 A1 | 9/2000 |

(Continued)

OTHER PUBLICATIONS

European Search Report for corresponding European application No. EP19305187; dated Aug. 7, 2019 (8 pages).

(Continued)

*Primary Examiner* — David W Lambert
(74) *Attorney, Agent, or Firm* — Mendelsohn Dunleavy, P.C.; Yuri Gruzdkov

(57) ABSTRACT

A bidirectional optical repeater having two unidirectional optical amplifiers and a supervisory optical circuit connected to optically couple the corresponding two optical paths through the repeater. In an example embodiment, the supervisory optical circuit is symmetrical in the sense that it enables the two optical input/output port pairs of the repeater to be interchangeable and functionally equivalent at least with respect to two supervisory wavelengths and some in-band and/or out-of-band wavelengths. This symmetry can advantageously be used, e.g., to improve the installation process directed at installing such optical repeaters in an undersea cable system. For example, a single directional orientation of the optical repeaters does not need to be maintained throughout the cable system, which can significantly reduce the risk and/or cost of installation errors.

15 Claims, 7 Drawing Sheets

(56) References Cited

U.S. PATENT DOCUMENTS

| | | |
|---|---|---|
| 6,301,404 B1 | 10/2001 | Yoneyama |
| 6,522,796 B1 | 2/2003 | Ziari et al. |
| 6,671,464 B1 | 12/2003 | Kikuchi |
| 6,708,004 B1 | 3/2004 | Homsey |
| 7,068,945 B2 | 6/2006 | Ogiwara et al. |
| 7,099,581 B2 | 8/2006 | Evangelides, Jr. et al. |
| 7,872,738 B2 | 1/2011 | Abbott |
| 7,885,539 B2 | 2/2011 | Leppla et al. |
| 8,009,983 B2 | 8/2011 | Zhang |
| 8,135,274 B2 | 3/2012 | Zhang et al. |
| 8,280,253 B2 | 10/2012 | Genay et al. |
| 8,502,964 B2 | 8/2013 | Wang et al. |
| 8,559,813 B2 | 10/2013 | Harman |
| 8,676,053 B2 | 3/2014 | Wang et al. |
| 8,805,183 B2 | 8/2014 | Dvir |
| 8,837,938 B2 | 9/2014 | Liu et al. |
| 8,942,556 B2 | 1/2015 | Zhao et al. |
| 9,008,503 B2 | 4/2015 | Urban et al. |
| 9,036,991 B2 | 5/2015 | Aguren |
| 9,042,721 B2 | 5/2015 | Randel et al. |
| 9,059,797 B2 | 6/2015 | Wang et al. |
| 9,130,672 B2 | 9/2015 | Zhang |
| 9,143,228 B2 | 9/2015 | Sandstrom |
| 9,154,258 B1 | 10/2015 | Mertz et al. |
| 9,170,173 B2 | 10/2015 | Perron et al. |
| 9,240,836 B1 | 1/2016 | Chen |
| 9,276,672 B2 | 3/2016 | Zhang et al. |
| 9,310,274 B2 | 4/2016 | Nagel et al. |
| 9,341,543 B2 | 5/2016 | Viswanathan |
| 9,960,845 B2 | 5/2018 | Ngo et al. |
| 2002/0131099 A1 | 9/2002 | Harasawa |
| 2002/0131696 A1* | 9/2002 | Yokoyama ......... H04B 10/0775 385/27 |
| 2004/0146305 A1 | 7/2004 | Neubelt et al. |
| 2004/0161244 A1 | 8/2004 | Yokoyama et al. |
| 2004/0201882 A1 | 10/2004 | Kikuchi |
| 2005/0226614 A1 | 10/2005 | Ogiwara et al. |
| 2005/0259998 A1 | 11/2005 | Fujieda et al. |
| 2006/0140627 A1 | 6/2006 | Yokoyama |
| 2006/0251423 A1 | 11/2006 | Evangelides, Jr. et al. |
| 2007/0115456 A1 | 3/2007 | Wisseman |
| 2007/0201873 A1 | 8/2007 | Buabbud et al. |
| 2008/0050120 A1 | 2/2008 | Neubelt |
| 2009/0324249 A1 | 12/2009 | Zhang |
| 2010/0092178 A1* | 4/2010 | Liu ................... H04B 10/0771 398/105 |
| 2010/0322627 A1 | 12/2010 | Desbruslais et al. |
| 2011/0216996 A1 | 9/2011 | Rogers |
| 2012/0136660 A1 | 5/2012 | Harman et al. |
| 2012/0257899 A1 | 10/2012 | Richardson et al. |
| 2013/0004162 A1 | 1/2013 | Osaka |
| 2013/0216176 A1 | 8/2013 | Li et al. |
| 2014/0086573 A1 | 3/2014 | Zhang et al. |
| 2014/0212130 A1 | 7/2014 | Urban et al. |
| 2014/0212131 A1 | 7/2014 | Zhang |
| 2015/0155934 A1 | 6/2015 | Nakagawa et al. |
| 2015/0171958 A1 | 6/2015 | Webb et al. |
| 2016/0099851 A1 | 4/2016 | Archambault et al. |
| 2016/0261340 A1 | 9/2016 | Yang et al. |
| 2017/0359127 A1 | 12/2017 | Moeller et al. |
| 2020/0036447 A1 | 1/2020 | Ait Sab et al. |

FOREIGN PATENT DOCUMENTS

| | | |
|---|---|---|
| EP | 1591768 A1 | 11/2005 |
| EP | 2088697 A1 | 8/2009 |
| EP | 2685641 A1 | 1/2014 |
| EP | 3076565 A1 | 10/2016 |
| EP | 3404852 A1 | 11/2018 |
| EP | 3404855 A1 | 11/2018 |
| EP | 3439200 A1 | 2/2019 |
| EP | 3599726 A1 | 1/2020 |
| JP | H03-42927 A | 2/1991 |
| JP | 2000-209151 A | 7/2000 |
| JP | 2001148665 A | 5/2001 |
| WO | WO2017168994 A1 | 10/2017 |
| WO | 2018210586 A1 | 11/2018 |
| WO | WO2018210470 A1 | 11/2018 |

OTHER PUBLICATIONS

White Paper "Line Monitoring and Control in Subsea Networks", www.Xtera.com, 2017 [retrieved on Sep. 20, 2019] Retrieved from the Internet: <URL: https://www.xtera.com/wp-content/uploads/2017/05/White-Paper-Line-Monitoring-and-Control-in-Subsea-Networks-Xtera-August-2016.pdf> (8 pages).

Bao, Xiaoyi et al., "Recent progress in distributed fiber optic sensors." Sensors 12.7 (2012): 8601-8639.

ITU-T Telecommunication Standard "G.694.1—Spectral grids for WDM applications: DWDM frequency grid", International Telecommunication Union, Feb. 2012 (16 pages).

Chen, Hongxin et al."Reduction of the impairment of online OTDR monitoring by use of a narrow bandwidth OTDR and an optical bandpass filter." IEEE Photonics Technology Letters 16.9 (2004): pp. 2198-2200.

Moeller, Lothar, et al. "Mitigating Nonlinear Crosstalk from In-service Line Monitoring Equipment for Undersea communication Systems." 2017 European Conference on Optical Communication (ECOC). IEEE, 2017. 3 pages.

Kim, Hyun Deok et al."A low-cost WDM source with an ASE injected Fabry-Perot semiconductor laser." IEEE Photonics Technology Letters 12.8 (2000): 1067-1069.

ITU-T Telecommunication Standard "G.979—Characteristics of monitoring systems for optical submarine cable systems", International Telecommunication Union, Nov. 2016 (16 pages).

Non-Final Office Action for U.S. Appl. No. 16/613,274; dated Mar. 26, 2021 (16 pages).

Extended European Search Report for European application No. 19305867.4; dated Jan. 7, 2021 (10 pages).

* cited by examiner

100

500

150

150

US 11,095,370 B2

SYMMETRICAL SUPERVISORY OPTICAL CIRCUIT FOR A BIDIRECTIONAL OPTICAL REPEATER

BACKGROUND

Field

Various example embodiments relate to optical communication equipment and, more specifically but not exclusively, to methods and apparatus for transmitting optical signals using amplified long-haul optical links.

Description of the Related Art

This section introduces aspects that may help facilitate a better understanding of the disclosure. Accordingly, the statements of this section are to be read in this light and are not to be understood as admissions about what is in the prior art or what is not in the prior art.

Subsea network operators are facing a fast growth in bandwidth demand, in part due to the development and deployment of cloud-based services. As a result, they need to optimize the capacity and performance of their fiber-optic cable plants to enable the corresponding networks to efficiently handle the increasing data flows. Due to this need, one of the requirements to telecom equipment manufacturers is to provide the network operator(s) with systems that can be used to operate the submerged plant elements in a manner that guarantees fast fault detection and mitigation, improved maintainability, good performance characteristics throughout the cable-plant's lifespan, upgradable capacity, and/or any other pertinent benchmarks. It is also desirable for the cable plant to be amenable to relatively low-cost implementation and/or maintenance.

SUMMARY OF SOME SPECIFIC EMBODIMENTS

Disclosed herein are various embodiments of a bidirectional optical repeater having two unidirectional optical amplifiers and a supervisory optical circuit connected to optically couple the corresponding two optical paths through the repeater. In an example embodiment, the supervisory optical circuit is symmetrical in the sense that it enables the two optical input/output port pairs of the repeater to be interchangeable and functionally equivalent at least with respect to two supervisory wavelengths and some in-band and/or out-of-band wavelengths. This symmetry can advantageously be used, e.g., to improve the installation process directed at installing such optical repeaters in an undersea cable system. For example, a single directional orientation of the optical repeaters does not need to be maintained throughout the cable system, which can significantly reduce the risk and/or cost of installation errors.

According to an example embodiment, provided is an apparatus comprising a first optical repeater having first and second optical input ports and first and second optical output ports, the first optical repeater comprising: a first optical path between the first input port and the first output port, the first optical path including a first optical amplifier configured to amplify optical signals transmitted in a first direction; a second optical path between the second input port and the second output port, the second optical path including a second optical amplifier configured to amplify optical signals transmitted in a second direction, the second direction being opposite to the first direction; and an optical circuit having a plurality of optical pathways therethrough that connect the first and second optical paths, said plurality including a first optical pathway that connects an input of the first optical amplifier and an input of the second optical amplifier, the first optical pathway including a first narrow band-pass optical filter and being configured to: direct light traveling in the first direction at the first optical input port toward the second optical output port, by way of the second optical amplifier; and direct light traveling in the second direction at the second optical input port toward the first optical output port, through the first optical amplifier.

In some embodiments of the above apparatus, the plurality of optical pathways includes a second optical pathway that connects an output of the first optical amplifier and an output of the second optical amplifier, the second optical pathway including a second narrow band-pass optical filter and being configured to: direct light traveling in the first direction at the output of the first optical amplifier to the second optical output port; and direct light traveling in the second direction at the output of the second optical amplifier to the first output port.

In some embodiments of any of the above apparatus, the plurality of optical pathways includes one or more third optical pathways configured to: direct light traveling in the second direction at the first optical output port toward the second optical output port; and direct light traveling in the first direction at the second optical output port toward the first optical output port.

According to another example embodiment, provided is a communication method comprising the steps of: providing an optical repeater with first and second optical input ports and first and second optical output ports; providing a first optical path between the first input port and the first output port, the first optical path including a first optical amplifier configured to amplify optical signals transmitted in a first direction; providing a second optical path between the second input port and the second output port, the second optical path including a second optical amplifier configured to amplify optical signals transmitted in a second direction, the second direction being opposite to the first direction; and connecting an optical circuit having a plurality of optical pathways therethrough that connect the first and second optical paths, said plurality including a first optical pathway that connects an input of the first optical amplifier and an input of the second optical amplifier, the first optical pathway including a first narrow band-pass optical filter and being configured to: direct light traveling in the first direction at the first optical input port toward the second optical output port, by way of the second optical amplifier; and direct light traveling in the second direction at the second optical input port toward the first optical output port, through the first optical amplifier.

In some embodiments of the above method, the plurality of optical pathways includes a second optical pathway that connects an output of the first optical amplifier and an output of the second optical amplifier, the second optical pathway including a second narrow band-pass optical filter and being configured to: direct light traveling in the first direction at the output of the first optical amplifier to the second optical output port; and direct light traveling in the second direction at the output of the second optical amplifier to the first output port.

In some embodiments of any of the above methods, the plurality of optical pathways includes one or more third optical pathways configured to: direct light traveling in the second direction at the first optical output port toward the second optical output port; and direct light traveling in the first direction at the second optical output port toward the first optical output port.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of features disclosed in European Patent Application Nos. EP17305569.0 and EP17305570.8, both filed on 17 May 2017, and in European Patent Application No. EP18306007.8, filed on 25 Jul. 2018, all of which applications are incorporated herein by reference in their entirety.

Figure 1:
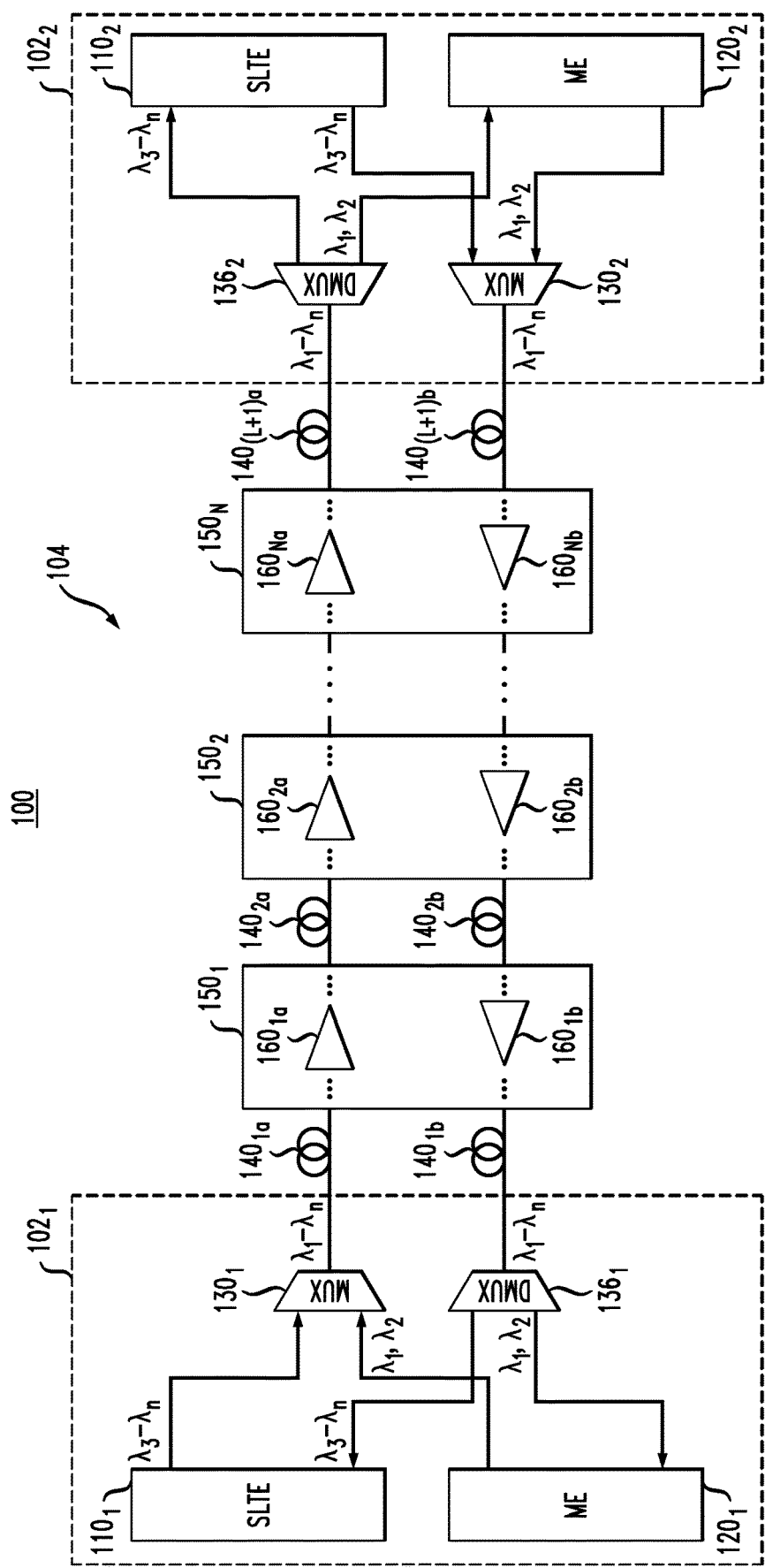
FIG. 1 shows a block diagram of an optical communication system according to an embodiment.

FIG. 1 shows a block diagram of an optical communication system 100 according to an embodiment. In the shown embodiment, system 100 comprises landing stations $102_1$ and $102_2$ connected by way of a wet plant 104. Landing stations $102_1$ and $102_2$ are typically further connected to respective terrestrial networks (not explicitly shown in FIG. 1). In an alternative embodiment, system 100 may have additional landing stations connected to wet plant 104, as known in the pertinent art, e.g., using one or more branching units (not explicitly shown in FIG. 1).

In an example embodiment, wet plant 104 comprises an undersea cable system that includes, inter alia, submersible optical repeaters $150_1$-$150_L$ serially connected by spans 140 of optical fiber, e.g., as indicated in FIG. 1, where L is a positive integer. In the shown embodiment, each span $140_i$ includes two optical fibers, which are labeled $140_{ia}$ and $140_{ib}$, respectively, where i=1, 2, ..., L+1. The number L of optical repeaters 150 used in wet plant 104 depends on the particular embodiment and may be in the range, e.g., from 1 to ~200. A typical length of a fiber span $140_i$ may range from ~50 km to ~100 km, depending on the distance between landing stations $102_1$ and $102_2$.

In the shown embodiment, an optical repeater $150_j$ comprises optical amplifiers (OAs) $160_{ja}$ and $160_{jb}$, where j=1, 2, ..., L. Optical amplifier $160_{ja}$ is configured to amplify optical signals traveling towards landing station $102_2$. Optical amplifier $160_{jb}$ is similarly configured to amplify optical signals traveling towards landing station $102_1$. In an example embodiment, an optical amplifier $160_j$ can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1), fed through the electrical conductor(s) of the corresponding submarine cable, which also typically contains optical fibers $140_{ia}$ and $140_{ib}$. In some embodiments, the electrical conductors (e.g., wires) may be located near the center of the submarine cable. In some other embodiments, the electrical conductors may have a generally tubular shape, e.g., with a ring-like cross-section in a plane orthogonal to the longitudinal axis of the submarine cable.

In an alternative embodiment, optical repeaters 150 can be designed for two, three, four, or more pairs of optical fibers $140_i$ connected thereto at each side thereof. For example, an optical repeater 150 designed to be compatible with a four-fiber-pair submarine cable typically includes eight optical amplifiers 160 arranged in four amplifier pairs, each pair being similar to optical amplifiers $160_{ja}$ and $160_{jb}$.

Optical repeater $150_j$ may also comprise a supervisory optical circuit (not explicitly shown in FIG. 1) that enables monitoring equipment (ME) units $120_1$ and $120_2$ located at landing stations $102_1$ and $102_2$, respectively, to monitor the operating status of the optical repeaters. Example embodiments of the supervisory optical circuit that can be used in optical repeater $150_j$ are described, e.g., in reference to FIGS. 6-7. Some embodiments of the supervisory optical circuit may benefit from the use of at least some features disclosed in the above-cited European Patent Application Nos. EP17305569.0 and EP17305570.8.

In an example embodiment, each of ME units $120_1$ and $120_2$ is configured to use dedicated supervisory wavelengths (labeled $\lambda_1$ and $\lambda_2$) to generate respective supervisory signals that can be sent through the corresponding fiber(s) 140 towards the remote landing station 102. The supervisory optical circuit of each optical repeater $150_j$ is configured to loop back, in the opposite direction, at least a portion of a supervisory signal. As a result, ME unit $120_1$ can receive a looped-back supervisory signal comprising the portions of the original supervisory signal returned to that ME unit by the different supervisory optical circuits of different optical repeaters $150_1$-$150_N$. Similarly, ME unit $120_2$ can receive a looped-back supervisory signal comprising the portions of the corresponding supervisory signal returned to that ME unit by the different supervisory optical circuits of different optical repeaters $150_1$-$150_N$. The looped-back supervisory signals received by ME units $120_1$ and $120_2$ can be processed and analyzed to determine the present operating status and/or certain operating characteristics of at least some or all of optical repeaters $150_1$-$150_N$ in wet plant 104. The determined parameters may include but are not limited to: (i) input and output signal levels and the gains of some or all individual optical amplifiers (OAs) $160_{ja}$ and $160_{jb}$; (ii) non-catastrophic faults in individual optical fibers $140_i$, such as any gradual loss increases therein; and (iii) catastrophic failures in individual optical repeaters $150_j$ and/or optical fibers $140_i$.

Landing station $102_1$ comprises a submarine line terminal equipment (SLTE) unit $110_1$ and ME unit $120_1$ connected to wet plant 104 by way of a wavelength multiplexer (MUX) $130_1$ and a wavelength de-multiplexer (DMUX) $136_1$ as indicated in FIG. 1. In an example embodiment, SLTE unit $110_1$ includes a wavelength-division-multiplexing (WDM)

transceiver (not explicitly shown in FIG. 1) configured to transmit and receive payload-carrying optical signals using carrier wavelengths $\lambda_3$-$\lambda_n$, where n generally denotes the number of WDM channels in system 100. The number n can be in the range, e.g., between ~10 and ~150.

In an example embodiment, carrier wavelengths $\lambda_1$-$\lambda_n$ can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX $130_1$ multiplexes the optical signals of carrier wavelengths $\lambda_3$-$\lambda_n$ generated by SLTE unit $110_1$ and the supervisory optical signals of carrier wavelengths $\lambda_1$ and $\lambda_2$, and applies the resulting multiplexed optical signal to optical fiber $140_{1a}$. DMUX $136_1$ de-multiplexes a multiplexed optical signal received from optical fiber $140_{1b}$ into two portions. The first portion has optical signals of carrier wavelengths $\lambda_3$-$\lambda_n$ and is directed to SLTE unit $110_1$. The second portion has the looped-back supervisory optical signals of carrier wavelengths $\lambda_1$ and $\lambda_2$ and is directed to ME unit $120_1$.

In an example embodiment, ME unit $120_1$ comprises an optical time-domain reflectometer (OTDR, not explicitly shown in FIG. 1) configured to optically probe wet plant 104 using carrier wavelengths $\lambda_1$ and $\lambda_2$. For example, ME unit $120_1$ can be designed to perform OTDR measurements by detecting and processing the looped-back supervisory optical signals received from optical repeaters $150_1$-$150_N$. In general, ME unit $120_1$ can be configured to use any suitable OTDR method. Some embodiments of ME unit $120_1$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety.

In some embodiments, landing station $102_1$ can be designed and configured to perform OTDR measurements in a normal operating mode, e.g., by detecting and processing reflected and/or backscattered optical signals having carrier wavelengths $\lambda_3$-$\lambda_n$.

Alternatively or in addition, landing station $102_1$ can be designed and configured to perform OTDR measurements in a special optical-link monitoring (OLM) operating mode, during which the corresponding transceiver generates and applies to wet plant 104 a modulated optical signal with a waveform that facilitates OTDR measurements, e.g., in terms of providing a higher signal-to-noise ratio (SNR) and/or a better spatial resolution for OTDR measurements than those technically achievable with payload-carrying optical signals. Transmission of payload data may be temporarily halted while landing station $102_1$ is in the OLM operating mode and may be resumed when the corresponding transceiver is switched back to the normal operating mode. This particular type of OTDR measurements can generally be performed using any suitable wavelength, with the possible exception of the wavelengths $\lambda_1$ and $\lambda_2$. The used wavelength may not necessarily coincide with any of the wavelengths $\lambda_3$-$\lambda_n$.

In different embodiments, some OLM functions can be based on different types of OTDR measurements. For example, in one possible embodiment, landing station $102_1$ can be designed and configured to perform OTDR measurements by detecting and processing the elastically reflected light and/or backscattered light produced due to Rayleigh scattering in wet plant 104. In another possible embodiment, landing station $102_1$ can be designed and configured to perform OTDR measurements by detecting and processing the backscattered light produced due to Brillouin scattering in wet plant 104. In yet another possible embodiment, landing station $102_1$ can be designed and configured to perform OTDR measurements by detecting and processing the backscattered light produced due to Raman scattering in wet plant 104. In yet another possible embodiment, landing station $102_1$ can be designed and configured to perform coherent OTDR (COTDR) measurements.

Landing station $102_2$ is generally analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment; (ii) system supervisory equipment; (iii) network management equipment; (iv) cable termination boxes; (v) network protection equipment; and (vi) various interface circuits.

In some embodiments, a single respective carrier wavelength can be used at each of ME units $120_1$ and $120_2$ to generate supervisory optical signals. In some other embodiments, more than two carrier wavelengths of the WDM set $\lambda_1$-$\lambda_n$ can be allocated for supervisory functions. A person of ordinary skill in the art will understand, without undue experimentation, how to modify MUXes 130, DMUXes 136, and/or other pertinent system components to be compatible with such alternative WDM-channel allocations for supervisory functions.

In an example embodiment, a supervisory optical circuit of optical repeater $150_j$ is implemented using narrow band-pass optical filters (NBPOFs, not explicitly shown in FIG. 1, see FIGS. 2A-2B and 6-7).

As used herein the term "narrow band-pass optical filter" refers to an optical device that passes optical frequencies (wavelengths) within a certain relatively narrow range and rejects (or strongly attenuates) optical frequencies outside that range. The bandwidth B of the narrow band-pass optical filter is much smaller than any of the carrier frequencies that are being passed therethrough. For example, a center frequency of the pass band can be ~200 THz, whereas the bandwidth B can be ~100 GHz or ~10 GHz, which is approximately three or four orders of magnitude smaller.

The planar-lightwave-circuit (PLC) technology enables telecom equipment manufacturers to produce narrow band-pass optical filters in large quantities and/or relatively inexpensively. There are many mature filter designs from which the manufacturer can choose for the intended application. In addition, a PLC-based narrow band-pass optical filter can be made tunable in a relatively straightforward manner, without an expensive and/or time-consuming redesign.

Various embodiments disclosed herein can beneficially leverage some of these and other technical features of narrow band-pass optical filters to provide a supervisory optical circuit for optical repeater $150_j$ that is capable of meeting and/or exceeding the operating requirements of network operator(s) and is amenable to low-cost implementation. In addition, at least some of the disclosed embodiments can beneficially provide significant flexibility in the manner in which supervisory optical circuits can be designed and/or operated.

Figure 2A:
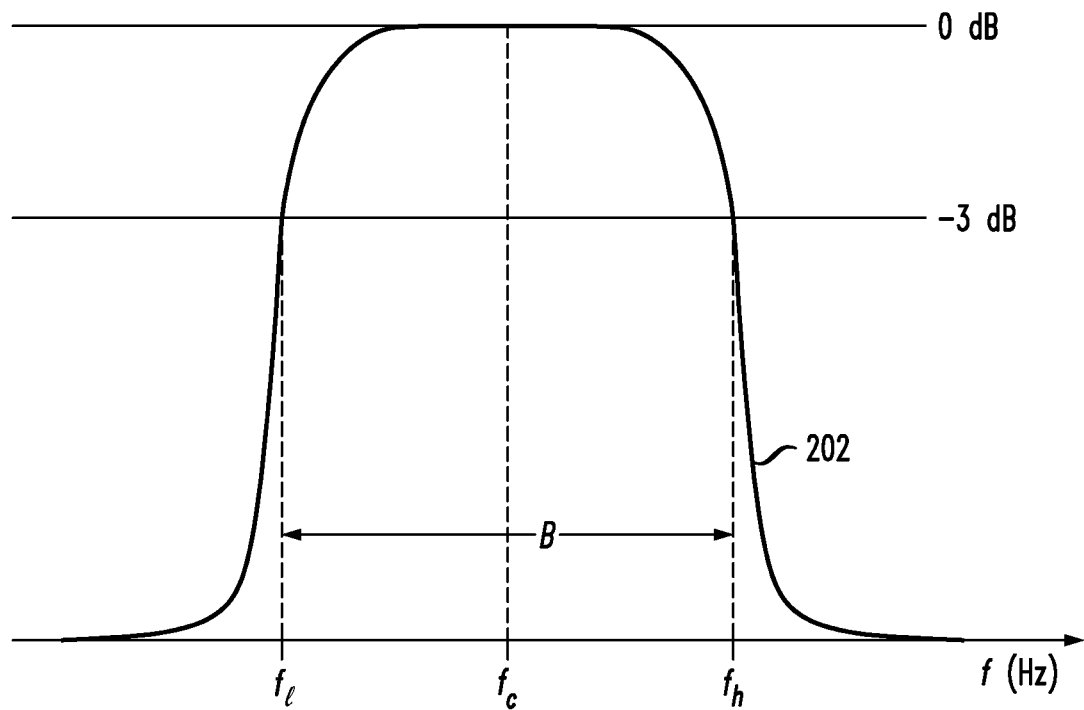
FIGS. 2A-2B graphically illustrate certain spectral characteristics of an example narrow band-pass optical filter that can be used in a supervisory optical circuit of an optical repeater of the optical communication system of FIG. 1 according to an embodiment.
Figure 2B:
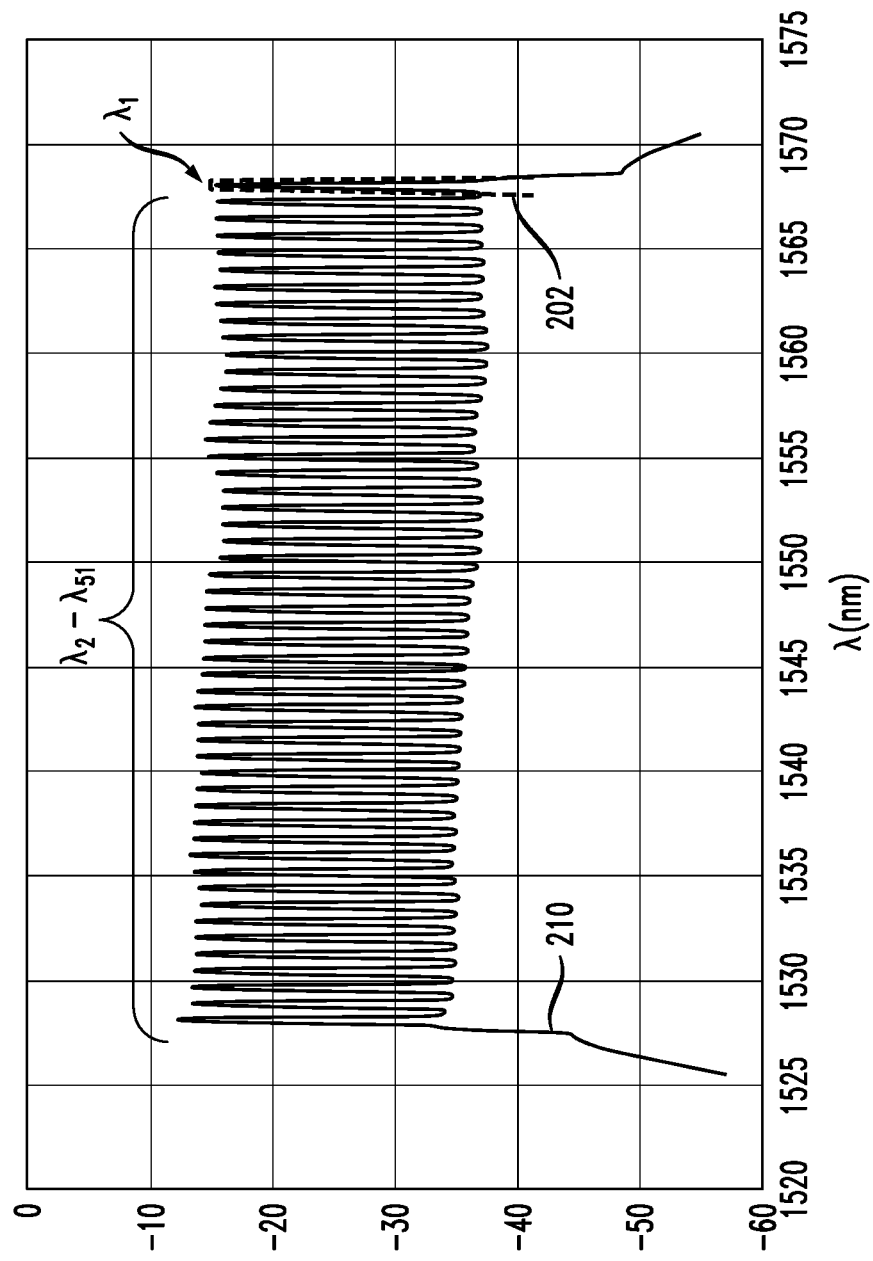

FIGS. 2A-2B graphically illustrate certain spectral characteristics of an example narrow band-pass optical filter that can be used in the supervisory optical circuit of optical repeater $150_j$ according to an embodiment. More specifically, FIG. 2A graphically shows a magnitude transfer function 202 versus frequency for a narrow band-pass optical filter. FIG. 2B graphically shows the spectral alignment of transfer function 202 with a spectrum 210 of an example WDM signal that can be used in system 100.

Referring to FIG. 2A, marked on the abscissa are (i) the center frequency $f_c$ of transfer function 202 and (ii) the frequencies $f_1$ and $f_h$ of the half-power points (gain −3 dB relative to the center portion) of transfer function 202. The bandwidth B of transfer function 202 can typically be defined as the difference between the frequencies $f_h$ and $f_1$, although an alternative definition is also possible.

Depending on the embodiment, the bandwidth B can be, e.g., 100, 50, 25, or 12.5 GHz. Other values of the bandwidth B can also be used, as long as the selected bandwidth value is compatible with the system's WDM configuration and/or WDM-channel assignment, e.g., as further illustrated in FIG. 2B.

The center frequency $f_c$ can belong to any telecom band. As known to those skilled in the pertinent art, the frequencies (wavelengths) used for optical communications are conventionally divided into several spectral bands in which optical fibers have relatively low transmission losses. For example, the spectral range between 1260 nm and 1625 nm is divided into five telecom bands that are typically referred to as O-, E-, S-, C-, and L-bands. The O-band is in the wavelength range between 1260 nm and 1360 nm. The E-band is in the wavelength range between 1360 nm and 1460 nm. The S-band is in the wavelength range between 1460 nm and 1530 nm. The C-band is in the wavelength range between 1530 nm and 1565 nm. The L-band is in the wavelength range between 1565 nm and 1625 nm.

In an example embodiment, a narrow band-pass optical filter does not employ a mirror configured to reflect in an opposite direction light applied thereto, the light being spectrally located within the bandwidth B.

Referring to FIG. 2B, spectrum 210 has fifty-one peaks corresponding to carrier wavelengths $\lambda_1$-$\lambda_{51}$ (i.e., n=51). Transfer function 202 is illustratively shown as being spectrally aligned with the peak corresponding to carrier wavelength $\lambda_1$, which is one of the dedicated supervisory wavelengths in system 100 (see FIG. 1). The center frequency $f_c$ and bandwidth B of transfer function 202 are such that a supervisory optical signal having carrier wavelength $\lambda_1$ can pass through the corresponding narrow band-pass optical filter with little attenuation, whereas any of the optical signals having carrier wavelengths $\lambda_2$-$\lambda_{51}$ is rejected or significantly attenuated due to being outside of the bandwidth B.

A person of ordinary skill in the art will understand that a narrow band-pass optical filter corresponding to any of the additional dedicated supervisory wavelengths (e.g., $\lambda_2$, FIG. 1) can similarly be spectrally aligned with the peak corresponding to that carrier wavelength in spectrum 210.

In an example embodiment, any of the narrow band-pass optical filters used in supervisory optical circuits disclosed herein can be implemented as a part of the corresponding planar lightwave circuit. In an example design, such a narrow band-pass optical filter does not employ a mirror configured to reflect, in an opposite direction, light applied to the filter by the corresponding supervisory optical circuit, e.g., if the light has a carrier frequency between $f_h$ and $f_1$ (see FIG. 2A). As used herein, the term "mirror" should be construed to cover, inter alia, conventional broadband mirrors, wavelength-selective reflectors, and Bragg reflectors.

Figure 3:
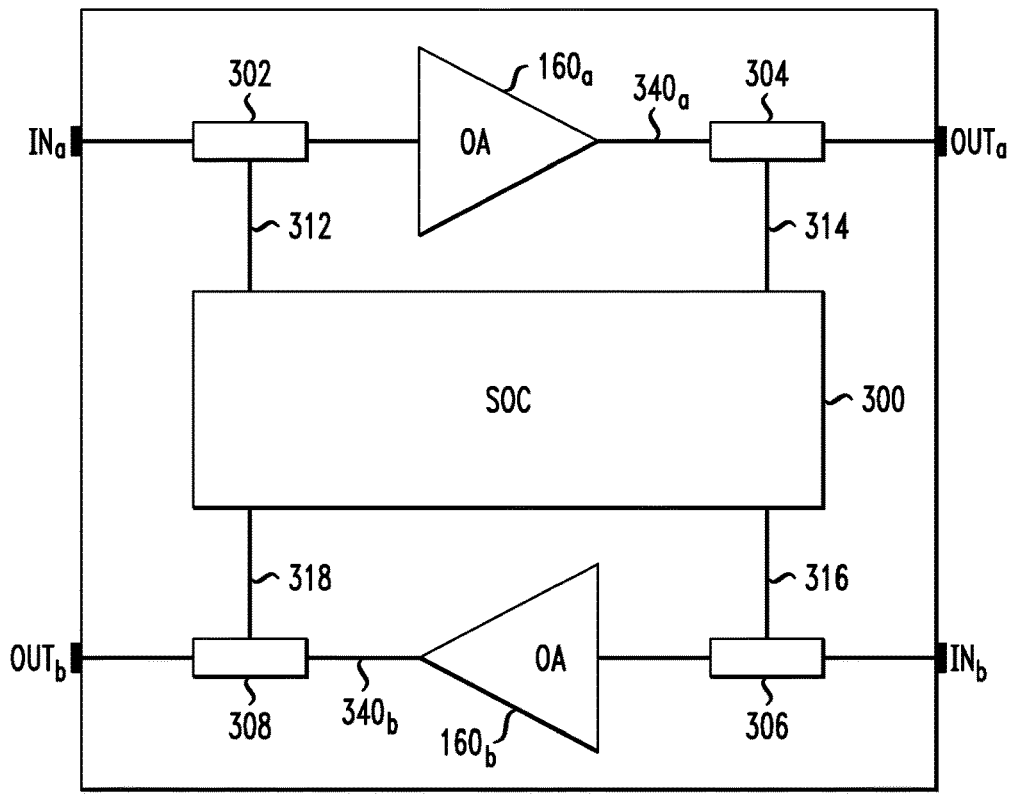
FIG. 3 shows a block diagram of an optical repeater that can be used in the optical communication system of FIG. 1 according to an embodiment.

FIG. 3 shows a block diagram of an optical repeater 150 according to an embodiment. Optical repeater 150 has optical input ports $IN_a$ and $IN_b$ and optical output ports $OUT_a$ and $OUT_b$ that can be used to connect the optical repeater to optical fibers of wet plant 104. For example, if this optical repeater 150 is deployed in system 100 (FIG. 1) as optical repeater $150_{j+1}$, then the ports $IN_a$, $IN_b$, $OUT_a$, and $OUT_b$ can be connected to optical fibers $140_{(j+1)a}$, $140_{(j+1)b}$, $140_{(j+2)a}$, and $140_{(j+2)b}$, e.g., as described in more detail below in reference to FIGS. 4 and 5.

In an example embodiment, circuit 300 can receive and emit optical signals on any of the ports $IN_a$, $IN_b$, $OUT_a$, and $OUT_b$, with each of these ports being a bidirectional optical port. The designation of the ports in this specification and in the appended claims as "input ports" or "output ports" should not be construed as limiting these ports to unidirectional configurations and is used to facilitate better understanding of certain circuit functions. For example, the ports $IN_a$ and $IN_b$ do operate as optical input ports for payload signals. The ports $OUT_a$ and $OUT_b$ similarly operate as optical output ports for the payload signals.

Optical amplifier (OA) $160_a$ of optical repeater 150 is located in an optical path $340_a$ that connects optical ports $IN_a$ and $OUT_a$. OA $160_b$ of optical repeater 150 is similarly located in an optical path $340_b$ that connects optical ports $IN_b$ and $OUT_b$. Optical repeater 150 also includes a supervisory optical circuit (SOC) 300 that optically couples optical paths $340_a$ and $340_b$ as described in more detail below. Example embodiments of circuit 300 are described in reference to FIGS. 6-7.

Figure 6:
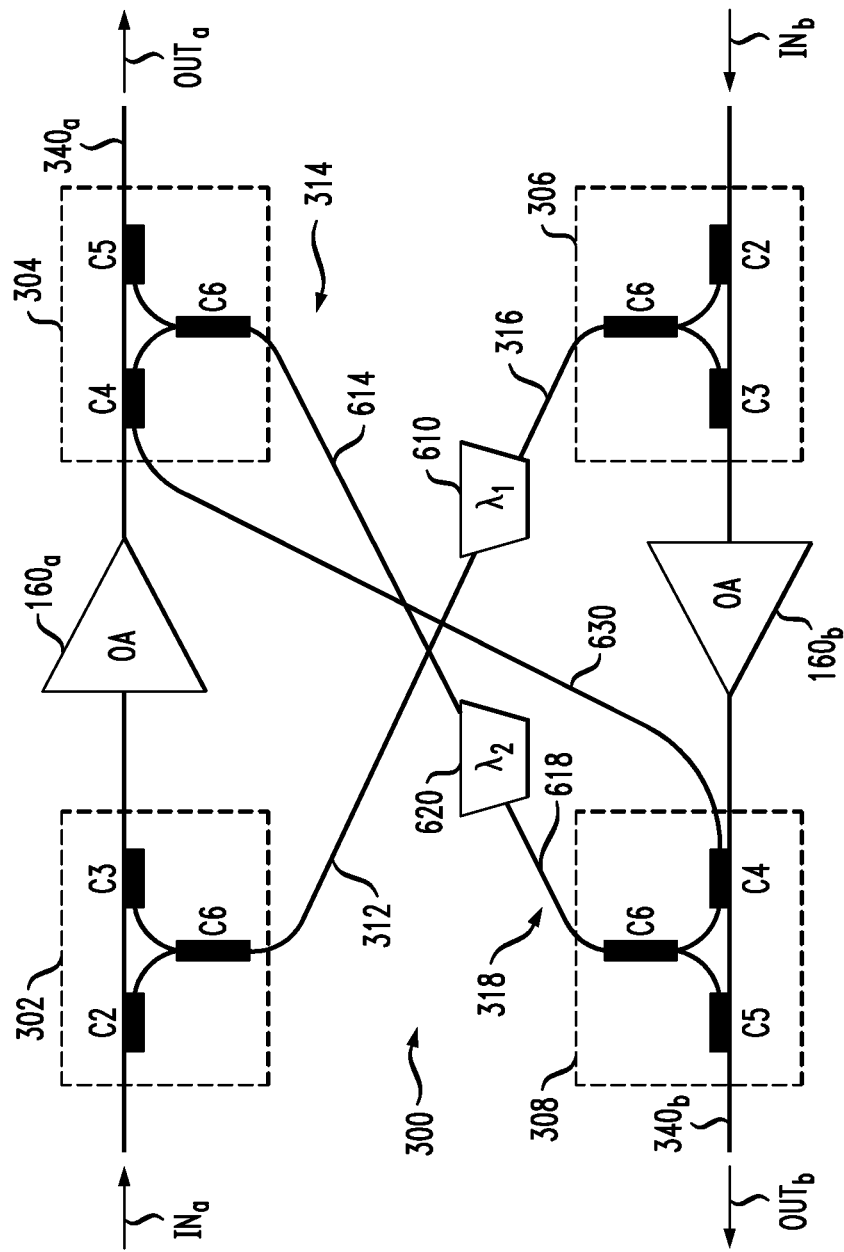
FIG. 6 shows a block diagram of the optical repeater of FIG. 3 that illustrates an optical supervisory circuit used therein according to an embodiment.
Figure 7:
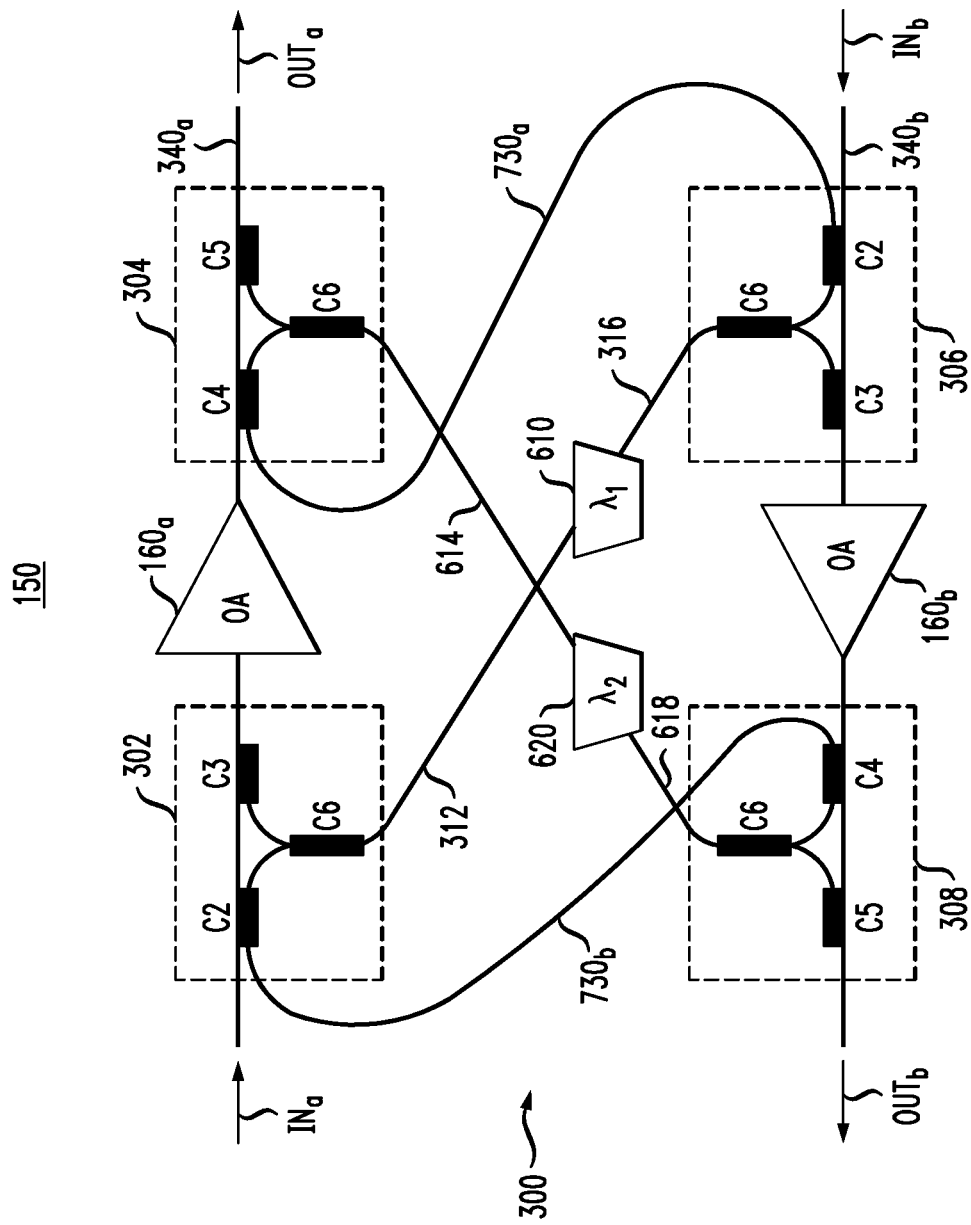
FIG. 7 shows a block diagram of the optical repeater of FIG. 3 that illustrates an optical supervisory circuit used therein according to another embodiment.

Optical repeater 150 uses optical couplers 302, 304, 306, and 308 and the sets of optical pathways 312, 314, 316, and 318 to couple circuit 300 to optical paths $340_a$ and $340_b$. Optical couplers 302 and 304 are located at the input and output, respectively, of OA $160_a$. Optical couplers 306 and 308 are similarly located at the input and output, respectively, of OA $160_b$. In various embodiments, each of the sets 312, 314, 316, and 318 may have a single respective optical pathway or two or more respective optical pathways, e.g., as illustrated in FIGS. 6-7. Each of such optical pathways of the sets 312, 314, 316, and 318 can be implemented, e.g., using an optical fiber, an optical waveguide, or a suitable combination thereof.

In an example embodiment, circuit 300 can be a planar lightwave circuit or a part of a planar lightwave circuit.

In operation, circuit 300 provides loop-back paths for the supervisory optical signals of carrier wavelengths $\lambda_1$ and $\lambda_2$. Said loop-back paths may incorporate NBPOFs corresponding to the wavelengths $\lambda_1$ and $\lambda_2$, e.g., as illustrated in FIGS. 6-7. Circuit 300 also provides (i) an optical pathway for the backscattered light to cross from optical path $340_a$ to optical path $340_b$ and (ii) an optical pathway for the backscattered light to cross from optical path $340_b$ to optical path $340_a$, both of these optical pathways being configured to bypass the NBPOFs corresponding to the wavelengths $\lambda_1$ and $\lambda_2$, e.g., as further illustrated in FIGS. 6-7. As such, the backscattered light directed through the latter optical pathways can be of any suitable wavelength, e.g., have one of carrier wavelengths $\lambda_3$-$\lambda_n$ or any out-of-band wavelength, such as a wavelength corresponding to a different telecom band than that of wavelengths $\lambda_1$-$\lambda_n$.

As known in the pertinent art, the backscattered light can be generated in wet plant 104 through a number of physical mechanisms, such as (i) a catastrophic defect in the optical fiber; (ii) a relatively large temperature gradient along the length of the optical fiber; (iii) a non-catastrophic defect that might be caused by sheering, stressing, shaking, and/or excessive bending of the optical fiber; etc.

Circuit 300 is symmetrical in the sense that it enables the input/output port pairs ($IN_a$, $OUT_a$) and ($IN_b$, $OUT_b$) to be interchangeable and functionally equivalent with respect to wavelengths $\lambda_1$-$\lambda_n$ and with respect to at least some out-of-band wavelengths. This symmetry can advantageously be used, e.g., to improve the installation process directed at installing optical repeaters 150 in wet plant 104. For example, a single directional orientation of optical repeaters 150 does not need to be maintained throughout wet plant 104, which can significantly reduce the risk and/or cost of installation errors.

Figure 4:
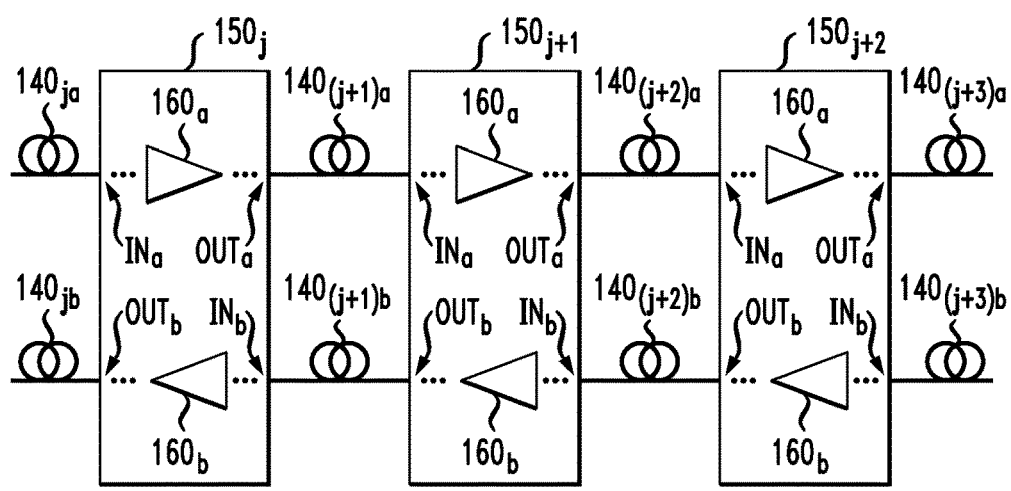
FIG. 4 shows a block diagram of a series of optical repeaters of FIG. 3 that can be used in the optical communication system of FIG. 1 according to an embodiment.

FIG. 4 shows a block diagram of a series 400 of optical repeaters 150 that can be used to implement a portion of wet plant 104 according to an embodiment. Series 400 has consecutive serially connected optical repeaters $150_j$, $150_{j+1}$, and $150_{j+2}$, each of which is nominally identical to the optical repeater 150 of FIG. 3. Note that the optical repeaters 150 in series 400 are all connected in the same directional orientation. That is: each of the optical fibers $140_{ja}$, $140_{(j+1)a}$, $140_{(j+2)a}$, and $140_{(j+3)a}$ is directly connected only to an optical port $IN_a$ and/or an optical port $OUT_a$ of optical repeaters $150_j$, $150_{j+1}$, and $150_{j+2}$; and each of the optical fibers $140_{jb}$, $140_{(j+1)b}$, $140_{(j+2)b}$, and $140_{(j+3)b}$ is directly connected only to an optical port $IN_b$ and/or an optical port $OUT_b$ of optical repeaters $150_j$, $150_{j+1}$, and $150_{j+2}$. As a result, the West-to-East optical path through series 400 goes only through OAs $160_a$ of optical repeaters $150_j$, $150_{j+1}$, and $150_{j+2}$, whereas the East-to-West optical path through series 400 goes only through OAs $160_b$ of these optical repeaters.

Figure 5:
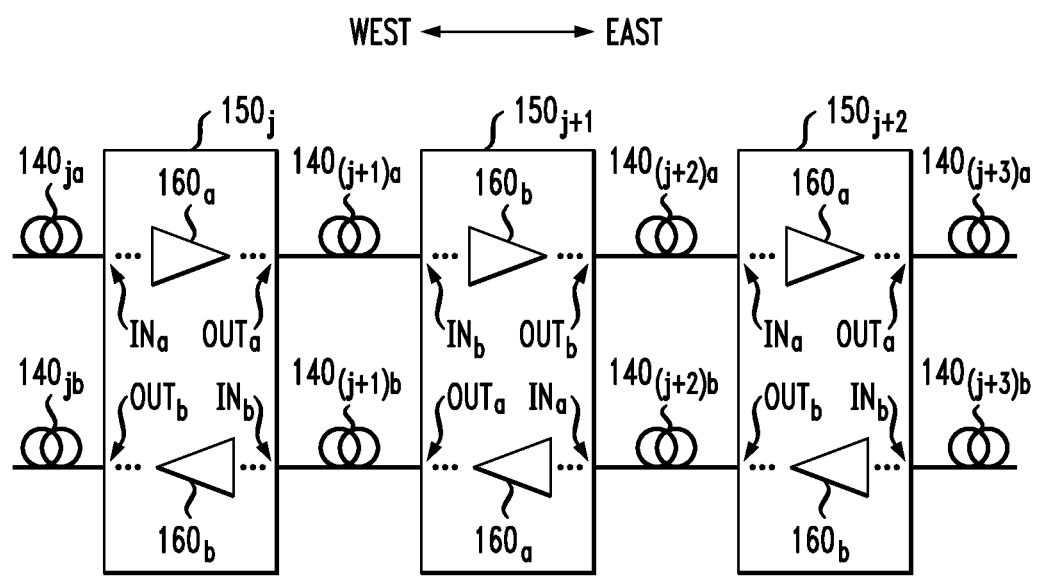
FIG. 5 shows a block diagram of a series of optical repeaters of FIG. 3 that can be used in the optical communication system of FIG. 1 according to another embodiment.

FIG. 5 shows a block diagram of a series 500 of optical repeaters 150 that can be used to implement a portion of wet plant 104 according to another embodiment. Series 500 is generally analogous to series 400 (FIG. 4) and is constructed using the same components. However, series 500 differs from series 400 in that, in series 500, not all of the optical repeaters 150 are connected in the same directional orientation. For example, the directional orientation of the optical repeater $150_{j+1}$ in series 500 is flipped with respect to the directional orientation of the same optical repeater $150_{j+1}$ in series 400.

Due to the orientation flip, optical fiber $140_{(j+1)a}$ is directly connected between the output port $OUT_a$ of optical repeater $150_j$ and the input port $IN_b$ of optical repeater $150_{j+1}$. Optical fiber $140_{(j+1)b}$ is directly connected between the output port $OUT_a$ of optical repeater $150_{j+1}$ and the input port $IN_b$ of optical repeater $150_j$. Optical fiber $140_{(j+2)a}$ is directly connected between the output port $OUT_b$ of optical repeater $150_{j+1}$ and the input port $IN_a$ of optical repeater $150_{j+2}$. Optical fiber $140_{(j+2)b}$ is directly connected between the output port $OUT_b$ of optical repeater $150_{j+2}$ and the input port $IN_a$ of optical repeater $150_{j+1}$. As a result, the West-to-East optical path through series 500 goes through two OAs $160_a$ and one OA $160_b$, whereas the East-to-West optical path through series 500 goes through two OAs $160_b$ and one OA $160_a$.

Typically, conventional optical repeaters need to be installed in the same directional orientation, e.g., in the manner similar to that used in series 400 (FIG. 4), due to certain characteristics (e.g., functional and/or structural asymmetries) of the supervisory optical circuits used therein. In this case, an inadvertent flip of the directional orientation of one or more (but not all) of the optical repeaters, e.g., in the manner producing wet plant portions that resemble series 500 (FIG. 5), can disadvantageously cause a total or partial breakdown in at least some OLM functions of the corresponding communication system. A person of ordinary skill in the art will readily understand that the corresponding remedial measures can be very costly.

In contrast, embodiments of supervisory optical circuit 300 disclosed herein advantageously make it possible to install each of optical repeaters 150 in wet plant 104 in any of the two possible directional orientations without imposing any adverse effects on the OLM functions of communication system 100. For example, wet plant 104 can be constructed to have some portions that are similar to series 400 (FIG. 4) and some other portions that are similar to series 500, while being able to fully support the intended OLM functions of the corresponding communication system 100. In some embodiments, wet plant 104 can be constructed to have any number $L_1$ of optical repeaters 150 installed in one directional orientation and the corresponding number $L_2$ of optical repeaters 150 installed in the relatively flipped directional orientation, where $L_1+L_2=L$, and $L_1$ and $L_2$ are both positive integers (also see FIG. 1). In some embodiments, wet plant 104 can be constructed without any specific requirements to the order in which optical repeaters 150 from the sets $L_1$ and $L_2$ are placed within wet plant 104.

FIG. 6 shows a block diagram of optical repeater 150 (FIG. 3) that illustrates in more detail an embodiment of the optical supervisory circuit 300. FIG. 6 uses the same labels as FIG. 3 to mark the same elements.

In the shown embodiment, optical couplers 302 and 306 are nominally identical, with each being implemented using respective instances (nominal copies) of optical couplers C2, C3, and C6. Optical pathway 312 is connected between the optical coupler C6 of optical coupler 302 and an NBPOF 610. Optical pathway 316 is similarly connected between the optical coupler C6 of optical coupler 306 and the NBPOF 610. The transfer function 202 of the NBPOF 610 has the center frequency $f_c$ corresponding to wavelength $\lambda_1$ (also see FIG. 2A).

Optical couplers 304 and 308 are also nominally identical, with each being implemented using respective instances of optical couplers C4, C5, and C6. In this case, each of the corresponding optical-pathway sets 314 and 318 (also see FIG. 3) includes two respective optical pathways. More specifically, the optical-pathway set 314 includes an optical pathway 614 and a corresponding portion of an optical pathway 630. The optical-pathway set 318 similarly includes an optical pathway 618 and another portion of optical pathway 630. Optical pathway 630 is connected between the optical couplers C4 of optical couplers 304 and 308. Optical pathway 614 is connected between the optical coupler C6 of optical coupler 304 and an NBPOF 620. Optical pathway 618 is similarly connected between the optical coupler C6 of optical coupler 308 and the NBPOF 620.

The transfer function 202 of the NBPOF 620 has the center frequency $f_e$ corresponding to wavelength $\lambda_2$ (also see FIG. 2A).

Inspection of the structures of circuit 300 and optical couplers 302, 304, 306, and 308 shown in FIG. 6 reveals the following structural/functional features.

NBPOF 610 can be traversed by supervisory optical signals of carrier wavelength $\lambda_1$ in both directions and can be used to monitor the respective input powers ($P_{in}$) of OAs $160_a$ and $160_b$. NBPOF 620 can similarly be traversed by supervisory optical signals of carrier wavelength $\lambda_2$ in both directions and can be used to monitor the respective output powers ($P_{out}$) of OAs $160_a$ and $160_b$. Optical pathway 630 can be used to transmit backscattered light in both directions.

A portion of a supervisory optical signal of carrier wavelength $\lambda_1$ received at the input port $IN_a$ can be looped back to output port $OUT_b$, e.g., as follows. Optical path $340_a$ directs the optical signal received through input port $IN_a$ to optical coupler 302, where a portion thereof is coupled into optical pathway 312 by way of optical couplers C2 and C6. Optical pathway 312 operates to direct the coupled optical signal through NBPOF 610 that passes the $\lambda_1$ component thereof and essentially stops all other spectral components thereof. Optical pathway 316 then directs the filtered $\lambda_1$ component to optical coupler 306, which operates to apply said component, by way of optical couplers C6 and C3, to the input of OA $160_b$. OA $160_b$ operates to amplify the received $\lambda_1$ component, and optical path $340_b$ directs the resulting amplified $\lambda_1$ component from the output of OA $160_b$, through optical couplers C4 and C5 of optical coupler 308, to output port $OUT_b$.

A portion of a supervisory optical signal of carrier wavelength $\lambda_1$ received at the input port $IN_b$ can be looped back to output port $OUT_a$, e.g., as follows. Optical path $340_b$ directs the optical signal received through input port $IN_b$ to optical coupler 306, where a portion thereof is coupled into optical pathway 316 by way of optical couplers C2 and C6. Optical pathway 316 operates to direct the coupled optical signal through NBPOF 610 that passes the $\lambda_1$ component thereof and essentially stops all other spectral components thereof. Optical pathway 312 then directs the filtered $\lambda_1$ component to optical coupler 302, which operates to apply said component, by way of optical couplers C6 and C3, to the input of OA $160_a$. OA $160_a$ operates to amplify the received $\lambda_1$ component, and optical path $340_a$ directs the resulting amplified $\lambda_1$ component from the output of OA $160_a$, through optical couplers C4 and C5 of optical coupler 304, to output port $OUT_a$.

Direct comparison of the two above-described loopback optical paths taken by the supervisory optical signals of carrier wavelength $\lambda_1$ reveals that these two loopback optical paths are nominally identical because they include only the same or nominally identical optical components.

In some embodiments, some of the couplers may be replaced by functional equivalents. In some of such embodiments, optical couplers 302 and 304 can differ from each other. Optical couplers 306 and 308 can also differ from each other.

A portion of a supervisory optical signal of carrier wavelength $\lambda_2$ received at the input port $IN_a$ can be looped back to output port $OUT_b$, e.g., as follows. Optical path $340_a$ directs the optical signal received at input port $IN_a$, through optical couplers C2 and C3 of optical coupler 302, to the input of OA $160_a$. OA $160_a$ operates to amplify the received $\lambda_2$ component and directs the resulting amplified $\lambda_2$ component to optical coupler 304, where a portion thereof is coupled into optical pathway 614 by way of optical couplers C4 and C6. Optical pathway 614 operates to direct the coupled optical signal through NBPOF 620 that passes the $\lambda_2$ component thereof and essentially stops all other spectral components thereof. Optical pathway 618 then directs the filtered $\lambda_2$ component to optical coupler 308, which operates to couple said component, by way of optical couplers C6 and C5, into optical path $340_b$. Optical path $340_b$ then directs the coupled component to output port $OUT_b$.

A portion of a supervisory optical signal of carrier wavelength $\lambda_2$ received at the input port $IN_b$ can be looped back to output port $OUT_a$, e.g., as follows. Optical path $340_b$ directs the optical signal received at input port $IN_b$, through optical couplers C2 and C3 of optical coupler 302, to the input of OA $160_b$. OA $160_b$ operates to amplify the received $\lambda_2$ component and directs the resulting amplified $\lambda_2$ component to optical coupler 308, where a portion thereof is coupled into optical pathway 618 by way of optical couplers C4 and C6. Optical pathway 618 operates to direct the coupled optical signal through NBPOF 620 that passes the $\lambda_2$ component thereof and essentially stops all other spectral components thereof. Optical pathway 614 then directs the filtered $\lambda_2$ component to optical coupler 304, which operates to couple said component, by way of optical couplers C6 and C5, into optical path $340_a$. Optical path $340_a$ then directs the coupled component to output port $OUT_a$.

Direct comparison of the two above-described loopback optical paths taken by the supervisory optical signals of carrier wavelength $\lambda_2$ reveals that these two loopback optical paths are nominally identical because they include only the same or nominally identical optical components.

Optical pathway 630 is configured to: (i) provide an optical path for the backscattered light externally received at output port $OUT_a$ to cross from optical path $340_a$ to optical path $340_b$; and (ii) provide an optical path for the backscattered light externally received at output port $OUT_b$ to cross from optical path $340_b$ to optical path $340_a$. As such, optical pathway 630 can be used to direct back to the corresponding one of landing stations $102_1$ and $102_2$ the backscattered light by way of the optical path having the optical amplifiers 160 that are directionally aligned with the propagation direction of the backscattered light.

A portion of the backscattered light received at output port $OUT_a$ can be directed to output port $OUT_b$, e.g., as follows. Optical path $340_a$ operates to direct the backscattered light received at output port $OUT_a$ to optical coupler 304, where a portion thereof is coupled into optical pathway 630 by way of optical couplers C5 and C4. Optical pathway 630 operates to direct the coupled optical signal to optical coupler 308, which operates to further couple said optical signal, by way of optical couplers C4 and C5, into optical path $340_b$. Optical path $340_b$ then directs the coupled light to output port $OUT_b$.

A portion of the backscattered light received at output port $OUT_b$ can be directed to output port $OUT_a$, e.g., as follows. Optical path $340_b$ operates to direct the backscattered light received at output port $OUT_b$ to optical coupler 308, where a portion thereof is coupled into optical pathway 630 by way of optical couplers C5 and C4. Optical pathway 630 operates to direct the coupled optical signal to optical coupler 304, which operates to further couple said optical signal, by way of optical couplers C4 and C5, into optical path $340_a$. Optical path $340_a$ then directs the coupled light to output port $OUT_a$.

Direct comparison of the two above-described backscattered-light paths reveals that these two optical paths are nominally identical because they include only the same or nominally identical optical components.

FIG. 7 shows a block diagram of optical repeater 150 (FIG. 3) that illustrates in more detail another embodiment of the optical supervisory circuit 300. The embodiment of FIG. 7 can be viewed as a modification of the embodiment of FIG. 6. This modification includes: (i) removing optical pathway 630 (see FIG. 6); and (ii) inserting optical pathways 730$_a$ and 730$_b$, with an appropriate modification of the two optical couplers C2. More specifically, optical pathway 730$_a$ is connected between the optical coupler C4 of optical coupler 304 and the optical coupler C2 of optical coupler 306. Optical pathway 730$_b$ is similarly connected between the optical coupler C4 of optical coupler 308 and the optical coupler C2 of optical coupler 302.

Since the loopback optical paths for the supervisory optical signals of carrier wavelength $\lambda_1$ and $\lambda_2$ are unchanged from the embodiment of FIG. 6, the description of those optical paths given in reference to FIG. 6 is also applicable to the embodiment of FIG. 7, and is not repeated here.

Optical pathway 730$_a$ is configured to provide an optical path for the backscattered light externally received at output port OUT$_a$ to cross from optical path 340$_a$ to optical path 340$_b$. Optical pathway 730$_b$ is similarly configured to provide an optical path for the backscattered light externally received at output port OUT$_b$ to cross from optical path 340$_b$ to optical path 340$_a$.

A portion of the backscattered light received at output port OUT$_a$ can be directed to output port OUT$_b$, e.g., as follows. Optical path 340$_a$ operates to direct the backscattered light externally received at output port OUT$_a$ to optical coupler 304, where a portion thereof is coupled into optical pathway 730$_a$ by way of optical couplers C5 and C4. Optical pathway 730$_a$ operates to direct the coupled optical signal to optical coupler 306, which operates to further couple said optical signal, by way of optical couplers C2 and C3, into optical path 340$_b$. Optical path 340$_b$ then applies the coupled light to the input of OA 160$_b$, where the latter undergoes optical amplification. The resulting amplified signal is then directed from the output of OA 160$_b$, through the optical couplers C4 and C5 of optical coupler 308, to output port OUT$_b$.

A portion of the backscattered light received at output port OUT$_b$ can be directed to output port OUT$_a$, e.g., as follows. Optical path 340$_b$ operates to direct the backscattered light externally received at output port OUT$_b$ to optical coupler 308, where a portion thereof is coupled into optical pathway 730$_b$ by way of optical couplers C5 and C4. Optical pathway 730$_b$ operates to direct the coupled optical signal to optical coupler 302, which operates to further couple said optical signal, by way of optical couplers C2 and C3, into optical path 340$_a$. Optical path 340$_a$ then applies the coupled light to the input of OA 160$_a$, where the latter undergoes optical amplification. The resulting amplified signal is then directed from the output of OA 160$_a$, through the optical couplers C4 and C5 of optical coupler 304, to output port OUT$_a$.

Note that, for both propagation directions, the received backscattered light undergoes optical amplification in the corresponding one of OAs 160$_a$ and 160$_b$. This feature is present only in the embodiment of FIG. 7. In contrast, in the embodiment of FIG. 6, the received backscattered light is routed to bypass OAs 160$_a$ and 160$_b$.

Direct comparison of the two above-described backscattered-light paths in the embodiment of FIG. 7 reveals that these two optical paths are nominally identical because they include only the same or nominally identical optical components.

In some embodiments, some or all of the above-described optical pathways through circuit 300 may include respective optical attenuators.

According to an example embodiment disclosed above, e.g., in the summary section and/or in reference to any one or any combination of some or all of FIGS. 1-7, provided is an apparatus comprising: a first optical repeater (e.g., 150, FIG. 3) having first and second optical input ports (e.g., IN$_a$, IN$_b$, FIG. 3) and first and second optical output ports (e.g., OUT$_a$, OUT$_b$, FIG. 3), the first optical repeater comprising: a first optical path (e.g., 340$_a$, FIG. 3) between the first input port and the first output port, the first optical path including a first optical amplifier (e.g., 160$_a$, FIG. 3) configured to amplify optical signals transmitted in a first direction; a second optical path (e.g., 340$_b$, FIG. 3) between the second input port and the second output port, the second optical path including a second optical amplifier (e.g., 160$_b$, FIG. 3) configured to amplify optical signals transmitted in a second direction, the second direction being opposite to the first direction; and an optical circuit (e.g., 300, FIGS. 3, 6, 7) having a plurality of optical pathways therethrough that connect the first and second optical paths, said plurality including a first optical pathway (e.g., 312/610/316, FIG. 6) that connects an input of the first optical amplifier and an input of the second optical amplifier, the first optical pathway including a first narrow band-pass optical filter (e.g., 610, FIG. 6) and being configured to: direct light traveling in the first direction at the first optical input port toward the second optical output port, by way of the second optical amplifier; and direct light traveling in the second direction at the second optical input port toward the first optical output port, through the first optical amplifier.

In some embodiments of the above apparatus, the plurality of optical pathways includes a second optical pathway (e.g., 614/620/618, FIG. 6) that connects an output of the first optical amplifier and an output of the second optical amplifier, the second optical pathway including a second narrow band-pass optical filter (e.g., 620, FIG. 6) and being configured to: direct light traveling in the first direction at the output of the first optical amplifier to the second optical output port; and direct light traveling in the second direction at the output of the second optical amplifier to the first output port.

In some embodiments of any of the above apparatus, the plurality of optical pathways includes one or more third optical pathways (e.g., 630, FIG. 6; 730, FIG. 7) configured to: direct light traveling in the second direction at the first optical output port toward the second optical output port; and direct light traveling in the first direction at the second optical output port toward the first optical output port.

In some embodiments of any of the above apparatus, the one or more third optical pathways include an optical pathway (e.g., 630, FIG. 6) connected between the output of the first optical amplifier and the output of the second optical amplifier.

In some embodiments of any of the above apparatus, the one or more third optical pathways include an optical pathway (e.g., 730$_a$, FIG. 7) connected between the output of the first optical amplifier and the input of the second optical amplifier.

In some embodiments of any of the above apparatus, the one or more third optical pathways further include an optical pathway (e.g., 730$_b$, FIG. 7) connected between the input of the first optical amplifier and the output of the second optical amplifier.

In some embodiments of any of the above apparatus, each of the one or more third optical pathways does not have a narrow band-pass optical filter therein.

In some embodiments of any of the above apparatus, the first narrow band-pass optical filter has a transfer function that causes the first narrow band-pass optical filter to pass a first wavelength and to reject a second wavelength; and wherein the second narrow band-pass optical filter has a transfer function that causes the second narrow band-pass optical filter to pass the second wavelength and to reject the first wavelength.

In some embodiments of any of the above apparatus, each of the first and second optical amplifiers is configured to amplify a respective WDM signal transmitted therethrough, the respective WDM signal configured to include a plurality of spectral components, each of the spectral components having a respective wavelength different from the first and second wavelengths; and wherein the first wavelength, the second wavelength, and the respective wavelengths are spectrally arranged in accordance with a wavelength grid.

In some embodiments of any of the above apparatus, the apparatus further comprises one or more additional optical repeaters (e.g., $150_2$-$150_L$, FIG. 1) serially connected with the first optical repeater along the first and second optical paths.

In some embodiments of any of the above apparatus, the one or more additional optical repeaters include a second optical repeater (e.g., $150_{j+1}$, FIG. 5) that is nominally identical to the first optical repeater; wherein a first optical fiber (e.g., $140_{(j+1)a}$, FIG. 5) is directly end-connected between the first output port of the first optical repeater (e.g., $150_j$, FIG. 5) and the second input port of the second optical repeater; and wherein a second optical fiber (e.g., $140_{(j+1)b}$, FIG. 5) is directly end-connected between the first output port of the second optical repeater and the second input port of the first optical repeater.

In some embodiments of any of the above apparatus, the one or more additional optical repeaters include a third optical repeater (e.g., $150_{j+2}$, FIG. 5) that is nominally identical to the first optical repeater; wherein a third optical fiber (e.g., $140_{(j+2)a}$, FIG. 5) is directly end-connected between the second output port of the second optical repeater (e.g., $150_j$, FIG. 5) and the first input port of the third optical repeater; and wherein a fourth optical fiber (e.g., $140_{(j+2)b}$, FIG. 5) is directly end-connected between the second output port of the third optical repeater and the first input port of the second optical repeater.

In some embodiments of any of the above apparatus, the apparatus further comprises an undersea fiber cable; wherein a first span of the undersea fiber cable includes the first and second optical fibers; and wherein a different second span of the undersea fiber cable includes the third and fourth optical fibers.

In some embodiments of any of the above apparatus, the one or more additional optical repeaters include a second optical repeater (e.g., $150_{j+1}$, FIG. 5) that is nominally identical to the first optical repeater; wherein a first optical fiber (e.g., $140_{(j+2)a}$, FIG. 5) is directly end-connected between the second output port of the second optical repeater and the first input port of the first optical repeater (e.g., $150_{j+2}$, FIG. 5); and wherein a second optical fiber (e.g., $140_{(j+2)b}$, FIG. 5) is directly end-connected between the second output port of the first optical repeater and the first input port of the second optical repeater. In some embodiments of any of the above apparatus, the first optical repeater is submersible.

According to another example embodiment disclosed above, e.g., in the summary section and/or in reference to any one or any combination of some or all of FIGS. 1-7, provided is a communication method comprising the steps of: providing an optical repeater (e.g., 150, FIG. 3) with first and second optical input ports (e.g., $IN_a$, $IN_b$, FIG. 3) and first and second optical output ports (e.g., $OUT_a$, $OUT_b$, FIG. 3); providing a first optical path (e.g., $340_a$, FIG. 3) between the first input port and the first output port, the first optical path including a first optical amplifier (e.g., $160_a$, FIG. 3) configured to amplify optical signals transmitted in a first direction; providing a second optical path (e.g., $340_b$, FIG. 3) between the second input port and the second output port, the second optical path including a second optical amplifier (e.g., $160_b$, FIG. 3) configured to amplify optical signals transmitted in a second direction, the second direction being opposite to the first direction; and connecting an optical circuit (e.g., 300, FIGS. 3, 6, 7) having a plurality of optical pathways therethrough that connect the first and second optical paths, said plurality including a first optical pathway (e.g., 312/610/316, FIG. 6) that connects an input of the first optical amplifier and an input of the second optical amplifier, the first optical pathway including a first narrow band-pass optical filter (e.g., 610, FIG. 6) and being configured to: direct light traveling in the first direction at the first optical input port toward the second optical output port, by way of the second optical amplifier; and direct light traveling in the second direction at the second optical input port toward the first optical output port, through the first optical amplifier.

In some embodiments of the above method, the plurality of optical pathways includes a second optical pathway (e.g., 614/620/618, FIG. 6) that connects an output of the first optical amplifier and an output of the second optical amplifier, the second optical pathway including a second narrow band-pass optical filter (e.g., 620, FIG. 6) and being configured to: direct light traveling in the first direction at the output of the first optical amplifier to the second optical output port; and direct light traveling in the second direction at the output of the second optical amplifier to the first output port.

In some embodiments of any of the above methods, the plurality of optical pathways includes one or more third optical pathways (e.g., 630, FIG. 6; 730, FIG. 7) configured to: direct light traveling in the second direction at the first optical output port toward the second optical output port; and direct light traveling in the first direction at the second optical output port toward the first optical output port.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. An apparatus comprising a first optical repeater having first and second optical input ports and first and second optical output ports, the first optical repeater comprising:
    a first optical path between the first input port and the first output port, the first optical path including a first optical amplifier configured to amplify optical signals transmitted in a first direction;
    a second optical path between the second input port and the second output port, the second optical path including a second optical amplifier configured to amplify optical signals transmitted in a second direction, the second direction being opposite to the first direction; and
    an optical circuit having a plurality of optical pathways therethrough that connect the first and second optical paths, said plurality including a first optical pathway between first and second optical couplers, the first optical coupler being on the first optical path at an input of the first optical amplifier, the second optical coupler being on the second optical path at an input of the second optical amplifier, the first optical pathway including a first narrow band-pass optical filter and being configured to:
        direct light traveling in the first direction at the first optical input port toward the second optical output port, by way of the second optical amplifier; and
        direct light traveling in the second direction at the second optical input port toward the first optical output port, through the first optical amplifier; and
    wherein the first narrow band-pass optical filter is located between the first and second optical couplers and has a bandwidth of 100 GHz or smaller.

2. The apparatus of claim 1,
    wherein the plurality of optical pathways includes a second optical pathway that connects an output of the first optical amplifier and an output of the second optical amplifier, the second optical pathway including a second narrow band-pass optical filter and being configured to:
    direct light traveling in the first direction at the output of the first optical amplifier to the second optical output port; and
    direct light traveling in the second direction at the output of the second optical amplifier to the first output port; and
    wherein the second narrow band-pass optical filter has a bandwidth of 100 GHz or smaller.

3. The apparatus of claim 2, wherein the plurality of optical pathways includes one or more third optical pathways configured to:
    direct light traveling in the second direction at the first optical output port toward the second optical output port; and
    direct light traveling in the first direction at the second optical output port toward the first optical output port.

4. The apparatus of claim 3, wherein the one or more third optical pathways include an optical pathway connected between the output of the first optical amplifier and the output of the second optical amplifier.

5. The apparatus of claim 3, wherein the one or more third optical pathways include an optical pathway connected between the output of the first optical amplifier and the input of the second optical amplifier.

6. The apparatus of claim 5, wherein the one or more third optical pathways further include an optical pathway connected between the input of the first optical amplifier and the output of the second optical amplifier.

7. The apparatus of claim 2,
wherein the first narrow band-pass optical filter has a transfer function that causes the first narrow band-pass optical filter to pass a first wavelength and to reject a second wavelength; and
wherein the second narrow band-pass optical filter has a transfer function that causes the second narrow band-pass optical filter to pass the second wavelength and to reject the first wavelength.

8. The apparatus of claim 7,
wherein each of the first and second optical amplifiers is configured to amplify a respective wavelength-division-multiplexed (WDM) signal transmitted therethrough, the respective WDM signal configured to include a plurality of spectral components, each of the spectral components having a respective wavelength different from the first and second wavelengths; and
wherein the first wavelength, the second wavelength, and the respective wavelengths are spectrally arranged in accordance with a wavelength grid.

9. The apparatus of claim 1, further comprising one or more additional optical repeaters serially connected with the first optical repeater along the first and second optical paths.

10. The apparatus of claim 9,
wherein the one or more additional optical repeaters include a second optical repeater having corresponding first and second optical input ports and corresponding first and second optical output ports;
wherein a first optical fiber is directly end-connected between the first output port of the first optical repeater and the second input port of the second optical repeater; and
wherein a second optical fiber is directly end-connected between the first output port of the second optical repeater and the second input port of the first optical repeater.

11. The apparatus of claim 10,
wherein the one or more additional optical repeaters include a third optical repeater having corresponding first and second optical input ports and corresponding first and second optical output ports;
wherein a third optical fiber is directly end-connected between the second output port of the second optical repeater and the first input port of the third optical repeater; and
wherein a fourth optical fiber is directly end-connected between the second output port of the third optical repeater and the first input port of the second optical repeater.

12. The apparatus of claim 9,
wherein the one or more additional optical repeaters include a second optical repeater having corresponding first and second optical input ports and corresponding first and second optical output ports;
wherein a first optical fiber is directly end-connected between the second output port of the second optical repeater and the first input port of the first optical repeater; and
wherein a second optical fiber is directly end-connected between the second output port of the first optical repeater and the first input port of the second optical repeater.

13. A communication method comprising:
providing an optical repeater with first and second optical input ports and first and second optical output ports;
providing a first optical path between the first input port and the first output port, the first optical path including a first optical amplifier configured to amplify optical signals transmitted in a first direction;
providing a second optical path between the second input port and the second output port, the second optical path including a second optical amplifier configured to amplify optical signals transmitted in a second direction, the second direction being opposite to the first direction; and
connecting an optical circuit having a plurality of optical pathways therethrough that connect the first and second optical paths, said plurality including a first optical pathway between first and second optical couplers, the first optical coupler being on the first optical path at an input of the first optical amplifier, the second optical coupler being on the second optical path at an input of the second optical amplifier, the first optical pathway including a first narrow band-pass optical filter and being configured to:
direct light traveling in the first direction at the first optical input port toward the second optical output port, by way of the second optical amplifier; and
direct light traveling in the second direction at the second optical input port toward the first optical output port, through the first optical amplifier; and
wherein the first narrow band-pass optical filter is located between the first and second optical couplers and has a bandwidth of 100 GHz or smaller.

14. The method of claim 13,
wherein the plurality of optical pathways includes a second optical pathway that connects an output of the first optical amplifier and an output of the second optical amplifier, the second optical pathway including a second narrow band-pass optical filter and being configured to:
direct light traveling in the first direction at the output of the first optical amplifier to the second optical output port; and
direct light traveling in the second direction at the output of the second optical amplifier to the first output port; and
wherein the second narrow band-pass optical filter has a bandwidth of 100 GHz or smaller.

15. The method of claim 14, wherein the plurality of optical pathways includes one or more third optical pathways configured to:
direct light traveling in the second direction at the first optical output port toward the second optical output port; and
direct light traveling in the first direction at the second optical output port toward the first optical output port.

* * * * *